United States Patent [19]

Brown

[11] Patent Number: 4,779,279
[45] Date of Patent: Oct. 18, 1988

[54] MAGNETIC LASER CONTROL

[75] Inventor: James R. Brown, Huntington Beach, Calif.

[73] Assignee: Beckman Instruments, Inc., Fullerton, Calif.

[21] Appl. No.: 59,231

[22] Filed: Apr. 8, 1987

Related U.S. Application Data

[63] Continuation of Ser. No. 814,018, Dec. 20, 1985, abandoned, which is a continuation of Ser. No. 586,511, Mar. 5, 1984, abandoned.

[51] Int. Cl.$^4$ .............................................. H01S 3/00
[52] U.S. Cl. ...................................... 372/37; 372/32; 372/20; 372/34
[58] Field of Search ................... 372/18, 20, 32, 37, 372/96, 99, 94, 101, 34, 29

[56] References Cited

U.S. PATENT DOCUMENTS

| | | | |
|---|---|---|---|
| 3,649,930 | 3/1972 | LeFloch | 372/37 |
| 4,398,293 | 8/1983 | Hall et al. | 372/32 |
| 4,468,773 | 8/1984 | Seaton | 372/18 |
| 4,672,618 | 6/1987 | Wijntjes et al. | 372/37 |

Primary Examiner—Léon Scott, Jr.
Attorney, Agent, or Firm—William H. May; P. R. Harder

[57] ABSTRACT

The present invention comprises a method and means for stabilizing the frequency difference between the component frequency modes in the beam of a gas laser influenced by Zeeman splitting. Stabilizing the frequency difference makes constant the frequency of the beat signal obtained from heterodyning the component modes. Stabilization is obtained by accurately controlling the difference in frequency between the component frequency modes to provide a selected separation, preferably 250 KHz, with deviation maintained at less than two KHz. The difference in frequencies is controlled independently of the individual frequency or intensity of either of the component frequency modes, or of their relative position within the "Doppler broadened" spectral profile characteristic of the lasing material.

2 Claims, 2 Drawing Sheets

MAGNETIC LASER CONTROL

This is a continuation of application Ser. No. 814,018, filed Dec. 20, 1985 now abandoned, which is a continuation of application Ser. No. 586,511, filed Mar. 5, 1984 now abandoned.

TECHNICAL FIELD

The technical field to which this invention pertains is the field of lasers influenced by a magnetic field to obtain a Zeeman frequency splitting effect in the output laser beam and, in particular, to stabilization controls for stabilizing the frequency components of the effected laser beam.

BACKGROUND ART

A short discussion of laser fundamentals is beneficial to an understanding of the prior art. A gas laser generates a monochromatic light beam having a very narrow frequency bandwidth. Thus, the exact wavelength of the light generated by a laser may be accurately determined. The frequency of a generated laser beam will fall somewhere within a finite gain profile of the spectral line bandwidth of the lasing material, which is defined by the gas species and the nature of the spectral broadening mechanism (e.g., Doppler broadening, pressure broadening, etc.)

A Doppler broadened profile of the 633 nm laser transition in helium-neon is graphically shown in FIG. 1, with light frequency plotted relative to intensity for a light beam emitted from excited He-Ne lasing material. The generally bell-shaped curve indicates along the X-axis the range of frequencies or spectral bandwidth within which stimulated light emission can be obtained. The frequency of an He-Ne laser beam will thus fall somewhere within this spectral bandwidth, as indicated by the lines $f_1$ or $f_2$, though the exact frequency position depends critically on the instantaneous length of the resonating chamber within which the lasing material is excited.

The Doppler broadened profile of the central spectral line $f_o$ characteristic of He-Ne lasing material typically has a bandwidth $\Delta f$ of 1500 MHz. The instantaneous bandwidth of a generated laser beam exists within the Doppler broadened bandwidth, as indicated for example by $f_1$, and is very narrow in comparison. The frequency of the laser beam may vary within a very large range, comparatvely as one in $10^6$, which permits a wide range of light wavelengths to be generated unless means is provided to control the frequency of the laser beam.

The frequency of a laser beam can be controlled by modulating the length of the resonating chamber in which the spectral emission is generated, i.e., the distance between the reflecting surfaces at the ends of the lasing chamber. This can be accomplished by varying the length of the chamber through electromechanical and/or thermal length varying elements. Prior art has instructed use of a piezoelectric element mounted within or on the outside of the casing of the lasing chamber, which changes length when control voltage is applied to provide immediate changes in chamber length. Heating elements or coils have been applied to the exterior of the chamber casing to induce thermally responsive changes in length, which provide a greater range of adjustment while being slower to react.

Through use of these techniques, the narrow bandwidth frequency of the laser beam may be positioned, or tuned, to a desired position within the spectral profile, and stabilized at a desired frequency.

When a gas laser is subjected to an axial magnetic field, circular birefringence induced in the active lasing material by the magnetic field produces a Zeeman-splitting effect on laser beam frequency. The result is the formation of two individual component frequency modes in the laser beam having opposing right and left circular polarizations, differing measurably in frequency. The frequency difference between the component modes is represented as $\Delta f_z$ in FIG. 2, which difference may vary on the order of 100 to 1500 KHz depending upon the strength of the magnetic field applied. Component frequency modes split by Zeeman effect are illustrated in FIG. 2 as $F_{1R}$ and $F_{1L}$, $F_{2e}$ and $F_{2e}$, and $F_{3R}$ and $F_{3L}$, which differ in frequency by $\Delta F_1$. The Zeeman effect on laser beam frequency results in a split of the spectral line within the Doppler broadened profile into two components, indicated by the shifted "Doppler" profiles to the right and left of the original "Doppler" profile (indicated by dotted line $F_o$). Each of the component frequency modes of the laser beam are likely to have a different light intensity, depending upon their position within the Doppler broadened spectral profile. This is indicated in FIG. 2 by the component line $F_{1R}$ having a greater intensity as measured along the Y-axis, than the component line $F_{1L}$. Similar results are visually explainable for $F_2$ and $F_3$.

The magnitude of $\Delta f_1$ 1 depends upon the magnetic field strength and the particular location of the frequency line of the laser beam within the "Doppler" profile. The difference in frequency $\Delta f$ reaches a minimum as the component frequency modes become symmetrically positioned about the line center of the original profile ($f_0$). Thus, minimizing the frequency difference $\Delta f$ between component frequency modes provides means of stabilizing the frequency at which the laser is operating. Similarly, intensity difference between the component modes differs depending on the particular location of the frequency line within the "Doppler" profile, while becoming closely equal at some point near the line center of the original profile ($f_o$), as shown by $F_3$.

When the component frequency modes of the laser beam are heterodyned, the resultant waveform has a frequency representative of the diffrence in frequencies $\Delta f$ between the component frequency modes. The frequency of the heterodyned waveform exhibits a characteristic beat signal, which is well known from the laws of wave physics. The characteristic beat signal obtained from heterodyning the differing frequency modes provides a measure of the difference in the frequencies of the mixed waves. The resultant beat signal is characterized by a first frequency which is an average of the frequencies of the mixed waves, and exhibits an amplitude oscillation, or beat, over time having a much slower second frequency. The second frequency or number of beats occurring per second, is a measure of the difference in frequencies of the combined waves described above. With regard to lasers subjected to a magnetic field to obtain Zeeman splitting of the laser beam frequency, this is referred to as the Zeeman beat signal of the component frequency modes.

The frequency difference between component frequency modes can be easily determined by digitally processing the beat count of the Zeeman beat signal per unit time. Thus the Zeeman beat signal provides a clear indication of frequency difference $\Delta f$ between the component frequency modes $F_{1R}$ and $F_L$, and can be used to control or stabilize the frequency of the magnetically influenced laser. These properties and phenomena of lasers influenced by a magnetic field have been taught by a number of published studies.

A laser permits the use of a direct measurement method using interferometry in which the wavelength of the laser beam serves as a standard unit of length for measurement. The laser is advantageous as a standard of measure due to its charactistic narrow frequency bandwidth, sharp focus and high intensity light beam, which exhibits an identifiable and accurately measurable light wavelength. The use of a laser in interferometry permits accuracy in length measurement to within fractions of a micron and finds itself to use of sample digital processing techniques to perform length measurement. For measurements of length using interferometric technique, in which the wavelength of the laser beam is used as a standard unit of measure, it is obviously advantageous to stabilize the laser frequency at a predictable and constant value to enable accurate measurement. Preferably, the laser beam should be stabilized with high accuracy of at least one in $10^7$.

The use of a laser exhibiting a Zeeman splitting of its beam frequency is particularly advantageous due to its characteristic beat signal, which has a continuous and easily measurable frequency.

Prior art teachings have shown a number of systems for controlling the frequency stability of an output lasr beam. For instance, Lang and Bouwhuis have taught a means of tuning a laser by inducing electrostrictive and thermal changes in the length of the lasing inducing chamber. The lasing chamber length is adjusted to stabilize the median frequency of the laser beam (the median frequency being the average frequency between the Zeeman split component modes) at the known spectral line which is chracteristic of the lasing material. Frequency stabilization is accomplished by measuring the intensity difference between the component modes and using the intensity difference measurement to generate a control signal to correct chamber length. The intensities of each of the component modes are alternately measured by an intensity sensitive photodetector. This is accomplished through selective transmittance of each of the component mode beams through an electro-optical crystal whose birefringence is modulated by an a.c. sgnal to alternately pass one or the other of the component frequencies for intensity measurement by the photodetector. This results in an alternating signal which is compared with the a.c. signal applied to a crystal to obtain a measurement of the difference in intensity of each of the component modes. A control signal is generated responsive to the intensity difference, which controls voltage applied to the chamber length tuning elements of the laser.

The chamber length is adjusted to equalize the intensities of the component modes, thus positioning each of the component modes symmetrically about the line center of the spectral profile, as discussed earlier and observable in FIG. 2. This also obtains a minimum frequency difference $\Delta f$ between component modes.

U.S. Pat. No. 3,534,292 of Cutler discloses in a system for modulating the length of the lasing chamber, through use of a piezoelectric element, to produce a frequency difference $\Delta f$ between component modes which is continually modulated. A signal representing the modulated frequency difference $\Delta f_{1-2}$ is supplied to a frequency discriminator, which converts the signal to one having an a.c. and d.c. component. The a.c. component is used to control the range of modulation of the lasing chamber length, and thus $\Delta f_{1-2}$, through use of a phase shift circuit. The a.c. component is detected to generate an error correction signal which is applied to the piezoelectric element to stabilize the laser component frequencies about the line center of the spectral profile of the lasing medium. The magnitude of the frequency difference between component modes is controlled by a differential amplifier which references a d.c. reference voltage supplied thereto. The differential amplifier generates a signal to control the strength of the magnetic field applied to the lasing chamber.

Morris and Ferguson have discussed a method of frequency stabilization for a laser influenced by a magnetic field, which consists of heterodyning the component mode frequencies and applying the heterodyned signal to a comparator. The comparator provides a frequency-to-voltage conversion signal which is integrated. The signal received from the integrator determines power to be applied to a heating element wound around the laser cavity wall which introduces a thermal adjustment to the length of the lasing chamber. This system is used to control the position of the component mode frequencies within the spectral profile.

Hall in patent application Ser. No. 300,363 filed September 1981 teaches a method of stabilizing the frequency of a laser which comprises obtaining an error signal by dithering (frequency modulating) the Zeeman split component modes within the Doppler broadened spectral range and measuring the difference in the component mode frequencies caused by each dither. An updown counting technique is used to measure change in frequency responding to each direction of a dither, which measurements are compared to determine equal change. Laser cavity length is adjusted to obtain a minimum frequency change of the component modes throughout the dithering cycle. Obtaining an equal frequency change with each dither centrally positions the component modes symmetrically about the line center of the spectral profile. The laser cavity length is servo controlled to maintain minimum frequency difference between component modes by continually applying the dither and counting the relative change in frequency difference between component modes in each direction of its cycle. The counts are maintained equal and opposite in sign.

The Hewlett-Packard Company, Inc. manufactures a gas laser utilizing the Zeeman splitting effect to obtain two component frequencies, which is identfied as Model 5525A. By a method similar to that of Lang and Bouwhis the laser is tuned to generate a beam having a frequency at the line center of the spectral profile. Timing is performed through control of a piezoelectric wafer which forms part of the wall structure of the laser cavity. The piezoelectric element is controlled by an electronic servo control loop. The control loop separately measures the intensities of each of the component frequency modes and compares the intensities measured to make them equal through adjustment of the length of the laser cavity. Equating the intensities of the component modes centers the component mode frequencies about the line center of the spectral profile. Thus, the frequency of each of the Zeeman component modes is controlled to equally differ from the frequency of the line center of the lasing material spectrum profile and the frequency difference between the components is maintained at a minimum to allow accurate prediction of the frequency difference.

Each of the above-described means and methods of stabilizing the frequencies of the components of a laser beam influenced by Zeeman splitting has failed to provide a highly accurate control of the difference in frequency Δf between component frequency modes, or in other words, the beat signal exhibited by their combination. Control of the frequency difference is a highly important funtion in an inferometric system which uses the beat signal as a standard unit of measure. The Lang and Bouwhis, and Hewlett-Packard frequency stabilization systems adjust the component mode frequencies to symmetrically flank the line center of the spectral profile, at which point the difference in frequency between the component frequency modes is a minimum and most predictable.

In these control methods it is the frequency of each component which is controlled within the spectral profile of the lasing material to obtain a predictable difference in frequency between them, resulting in a constant beat signal upon their combination. This has been accomplished through a measurement function (of intensity) performed on each of the component frequency modes, thus introducing an additional possibility of error in the control system. These measurements, and related control operations require more complicated electronic circuitry. Since with these control methods the actual difference in frequency is not controlled, the frequency difference may not be accurately controlled and may change from one laser to the next. Furthermore, the value of the difference in frequency may be disturbed by environmental magnetic fields even though the frequencies of component frequency modes are being accurately controlled, resulting in differing beat signal frequencies in differing environments.

Nor is the frequency difference Δf directly controlled by Hall or Cutler. The method described by Hall seeks to minimize the difference in frequency between component frequency modes. The dither or frequency modulation technique used to obtain an indication of the frequency difference to determine when a minimum value is reached requires complicated and expensive servo electronics. Furthermore, dithers from optimum stability of component mode frequency constantly causes a slight change in frequency difference, which derogatorily affects stability and thus constancy of the beat signal. Also, the necessity of performing a dither reduces frequency response. The continual modulation of the length of the lasing chamber and thus the difference in frequency taught by Cutler clearly affects the ability of the servo system to accurately stabilize the difference in frequency of the component modes. This technique approximates that of Hall in applying a dither to continually change the frequencies to obtain a comparison value indicative of a minimum frequency variation.

The Morris/Ferguson system admittedly has an observed frequency difference variation of 200 Hz which clearly indicates that the ability of the system to control the frequency difference is limited. Furthermore, there is no indication of the reference to which the beat signal is compared to obtain a frequency-to-voltage conversion. It would seem that the teaching presented merely indicates that the frequency difference signal may be integrated to obtain a time based control signal adapted to tune the length of the lasing chamber.

Each of the above-referenced teachings attempts control of the frequency difference between component frequency modes of a laser effected by Zeeman splitting through indirect techniques which position the individual component mode frequencies symmetrically within the Doppler broadened profile of the spectral line of the lasing material, to obtain a predictable value of the difference frequencies. A clear need remains for a control which can accurately and directly determine the frequency difference, or beat signal, produced by the component frequency modes of a laser influenced with a magnetic field. Accuracy in stabilizing the frequency difference is clearly advantageous in interferometric techniques for measurement where the frequency difference or beat signal supplies the basic unit used for measurement.

DISCLOSURE OF THE INVENTION

The present invention comprises a method and means for stabilizing the frequency difference between the component frequency modes in the beam of a gas laser influenced by Zeeman splitting. Stabilizing the frequency difference makes constant the frequency of the beat signal obtained from heterodyning the component modes. Stabilization is obtained by accurately controlling the difference in frequency between the component frequency modes to provide a selected separation, preferably 250 KHz, with deviation maintained at less than two KHz. The difference in frequencies is controlled independently of the individual frequency or intensity of either of the component frequency modes, or of their relative position within the "Doppler broadened" spectral profile characteristic of the lasing material.

An electronic servo control loop is provided which drives a magnetic flux element for tuning frequency separation of the component frequency modes and a thermal element for tuning the length of the lasing chamber of the laser, to accurately control the frequency difference between the component mode frequencies and thus the beat signal frequency. The servo loop contains a frequency synthesizer, or an alternative clock pulse source, which generates a reference signal characteristic of the beat signal frequency. The phasing of the reference signal is referenced to that of the beat signal for direct control and stabilization of the beat signal frequency in the output laser beam.

The reference signal can possess any number of the harmonic frequencies of a desired beat signal frequency to provide a highly accurate division of the wavelength which is used as the standard unit of measurement in an interferometric system. Since the reference signal is phase related to the beat signal, harmonic divisions are a highly accurate subdivision providing increased resolution for interferometric measurement techniques.

The reference signal is preferably generated with a crystal oscillator which provides an accurate and stable pulsed signal to which the beat signal may be referenced. This application substantially reduces phase jitter and frequency drift to a fraction of a wavelength of the resonated beam. The improved accuracy substantially reduces error in measurements for which the beat signal wavelength is used as a standard unit.

The present invention provides a simple, low-cost servo control which accurately controls the frequency difference Δf between component frequency modes in a Zeeman effeced laser, fulfilling a vital need existing in view of prior art means and methods of stabilizing laser output frequency. It further provides a source of a reference signal which, in addition to providing control of the frequency difference between component modes, provides a highly accurate reference signal representative of the beat signal frequency, i.e., standard unit of measurement. This enables great flexibility in synchronizing external events to the beat signal derived from heterodyning the component modes. Since the beat signal is used as a unit of measurement in interferometric techniques, the co-related reference signal provides a basis for processing the results obtained from operation of the interferometric system. Since the difference in frequencies of the output beam components is actively and directly controlled and maintained to a constant value, irrespective of environmental influence, minor differences in laser assemblies and changes in environmental magnetic fields, the Zeeman affected laser provides an extremely accurate means for measuring.

BEST MODE OF THE INVENTION

Figure 1:
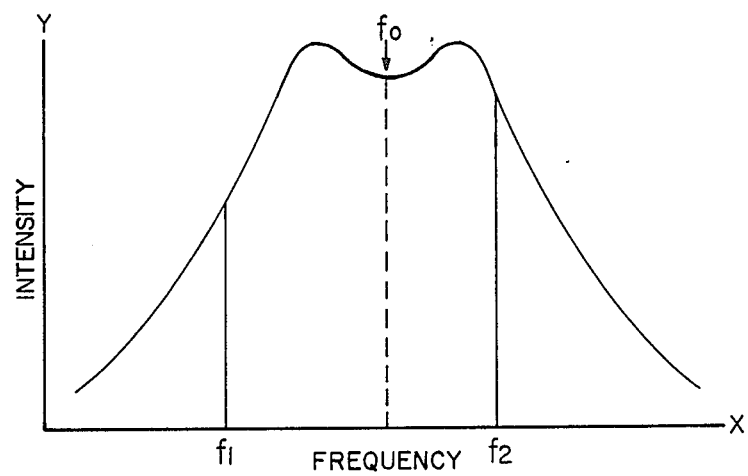
FIG. 1 is a graph of a frequency vs. intensity plot the Doppler broadened spectral profile of a lasing material excited by an energy source.
Figure 2:
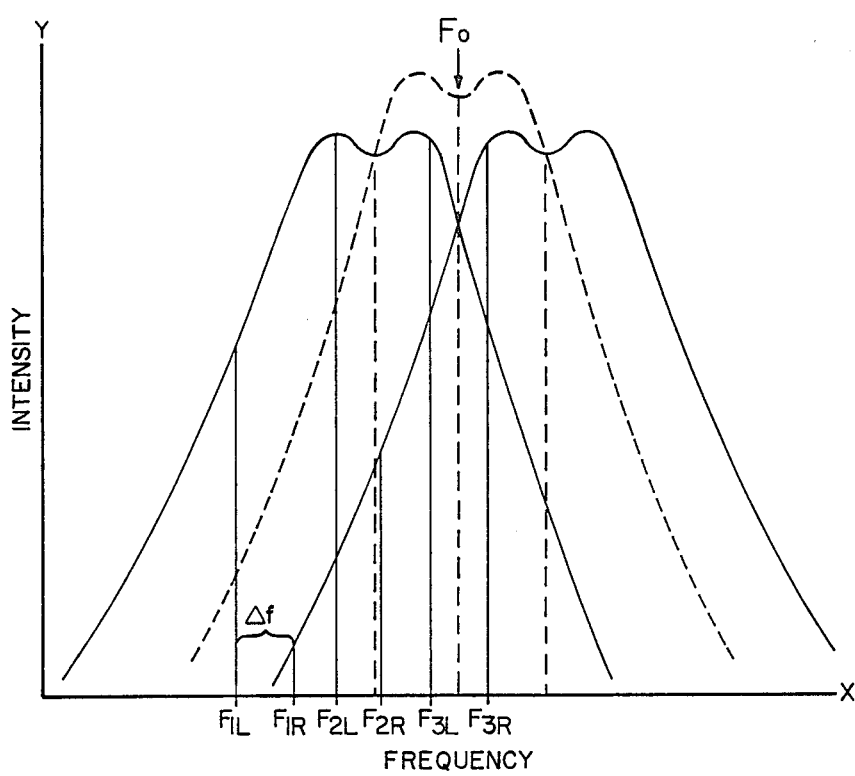
FIG. 2 is a graph of a frequency vs. intensity plot showing the frequency splitting of spectral profiles in a lasing material effected by a magnetic field and indicating specific locations possible for component frequency modes in an output laser beam.
Figure 3:
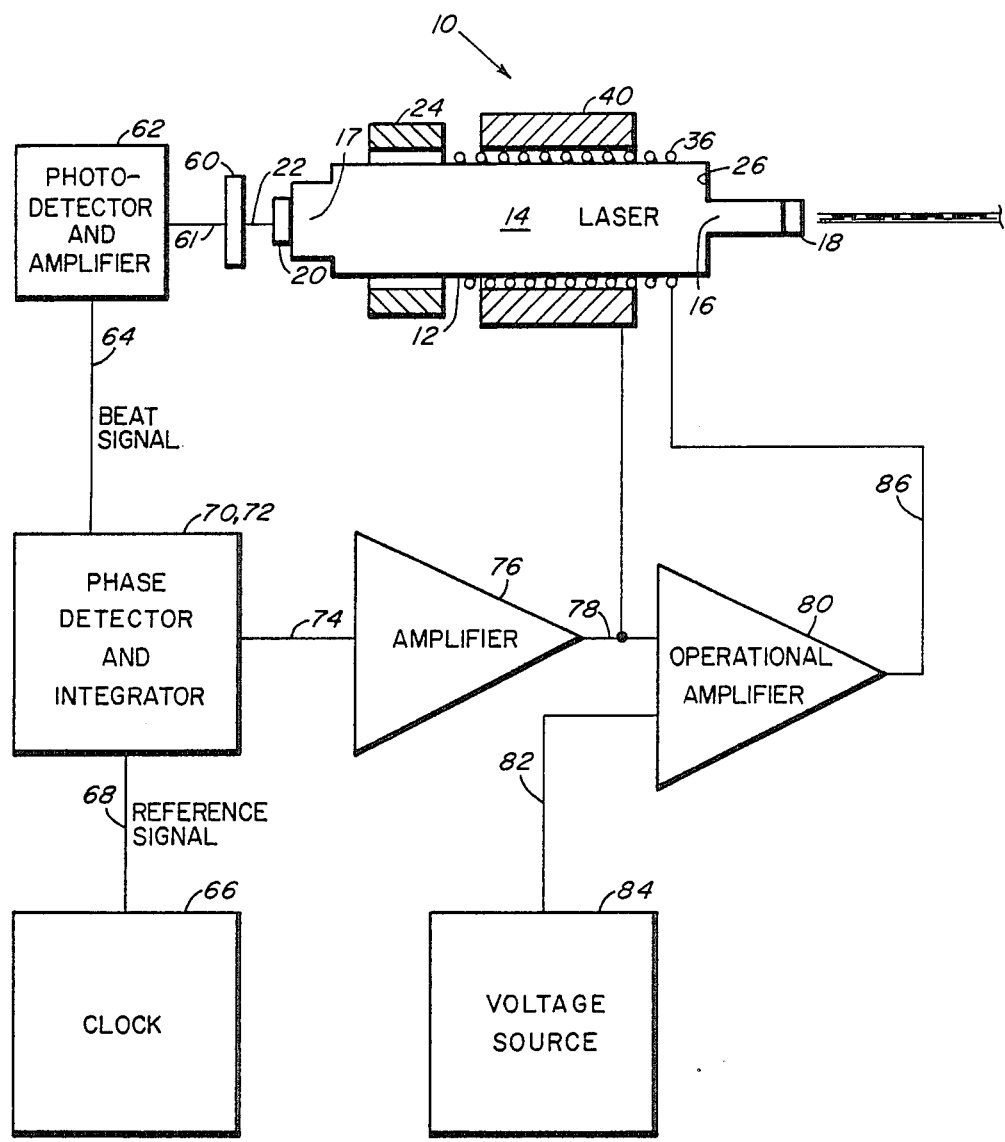
FIG. 3 is a schematic representation of the closed loop servo control for controlling frequency difference between component frequency modes of a Zeeman effected gas laser.

This invention comprises a closed loop servo control system, schematically depicted in FIG. 3, for directly controlling the difference in frequencies $\Delta f$ of the component frequency modes of a laser beam influenced by a magnetic field to exhibit Zeeman frequency splitting phenomenon.

A laser structure 10 generally comprises a tubular wall 12 which defines an internal chamber 14 in which lasing material is encapsulated. At a forward end 16 of the chamber 14, a partially reflective reflector 18 is positioned to partially transmit and to partially reflect the electromagnetic radiation emitted by the excited lasing material. At the opposing end 17 of the laser chamber 14, a second reflector 20 is positioned to reflect the electromagnetic radiation emitted by the excited lasing material. The reflector 20 is provided with a small window (not shown) to pass a secondary laser beam 22 rearward from the lasing chamber 14 for control purposes.

The lasing material in the chamber 14 is excited to a high energy state, generally by electrical discharge, to obtain a stimulated emission of electromagnetic energy or radiation. The length of the chamber 14, or more specifically, the distance between the reflecting surfaces of the reflectors 18 and 20, is made equal to an integral multiple of the light wavelength of the emitted radiation. This provides optical resonance of the electromagnetic waves generated within the chamber 14 to generate a laser beam which exits the lasing chamber 14 through partial reflector 18. The chamber length may be tuned within a narrow range to selectively determine the light wavelength of the generated laser beam within the "Doppler broadened" spectral profile of the lasing material, as discussed previously.

The lasing material contained in the chamber 14 is preferably an isotropic mixture of naturally occurring Neon at 0.35 for partial pressure, and $He_3$ helium at 3.75 for partial pressure. A laser containing a preferred lasing material is available from the Aerotech Corporation a Model LT05R.

A magnet 24 is positioned concentrically around the tubular wall 12 of the laser 10, to apply an axial magnetic field to the excited lasing material within the chamber 14. The magnetic field influences the atoms of the lasing material to produce a Zeeman frequency splitting effect in the generated laser beam, which results in splitting of the beam emitted from the laser into two component frequency modes. Each of the component frequency modes is circularly polarized in opposing direction and their respective frequencies differ by a small amount $\Delta f$, as has been discussed. The individual frequencies of the component modes and the difference in frequency between them, can be manipulated within the Doppler broadened spectral profile (frequency range) of the lasing materal, through changes in the distance between the reflectors 18 and 20 and variance in the magnetic field applied. Thus by providing means for axially adjusting one of the reflectors 18 or 20 relative to the other, to change the distance between the reflecting surfaces, the frequency difference between component frequency modes of the laser beam can be tuned to a selected value. This value as previously defined equals the Zeeman beat signal frequency.

Variance of the strength of the magnetic field applied to the stimulated emission of the lasing material has been found to result in a change of frequency of each of the component modes generated in the laser beam by the Zeeman frequency splitting effect. Furthermore, magnetic field strength variance effects frequency change of each of the component frequency modes disproportionately, depending upon the relative position of the component modes within the Doppler expanded spectral profile, permitting its use to control the difference in frequency between the component modes, and thus the beat signal frequency.

A single magnetic field may be applied and varied to tune the frequencies; however, to more directly associate frequency change with magnetic field control and to simplify servo control design, a first steady state magnetic field and a second variable or alternating magnetic feld can be simultaneously applied to the lasing material to obtain the desired results. In either case the effect is the same. For clarity in explanation the bipartite configuration will be described herein.

A combination of systems for varying lasing chamber length and applied magnetic field provides a distinctly advantageous method and means for controlling and stabilizing the frequency difference between the component frequency modes of the Zeeman split laser beam, and thus the beat signal frequency. Variance of applied magnetic field can be accomplished instantaneously. This permits rapid adjustment of the difference in frequency between the component modes. Magnetic field variance is limited in effect, however, by intensity variance.

Cooperative length adjustment of the lasing chamber overcomes this range limitation and permits an extended range of control of the frequency difference while generally requiring a longer period of time to obtain reactions of the chamber adjustment mechanism. Thus through combination of the chamber length and magnetic field control systems a wide range, fast reacting control means and method is provided to and stabilize the beat signal frequency.

Available magnetic field may be provided by an electromagnetic element 40 such as a wound coil of magnetic wire which is coaxially located about the lasing chamber 14. A wound coil which provides the desired magnetic flux field may be constructed of 250 turns of 30 AWG magnet wire (R/m #21-065-19) about a bobbin or other cylindrical receiver which is approximately two inches in diameter.

The electromagnetic element produces available magnetic flux field when electrical energy is applied which when used with the steady magnetic field produces a desired rnage of variance in the frequency difference between component frequency modes of the laser. The range of adjustment in frequency difference which can be accomplished with a variable magnetic field is narrow; however, response of the laser to changes in magnetic strength is instantaneous. Thus, the electromagnetic element provides a narrow range, fast reacting adjustment for the beat signal frequency.

A heating element 36 is provided and wound around the circumference of a central portion of the laser body 12. Electrical energy is supplied to the heating element 36 surrounding the laser wall 12 to generate heat energy which will increase or decrease the temperature of the laser wall 12 to increase or decrease its length. The expansion or contraction of the laser wall 12 in response to applied heat energy moves the reflectors 18 and 20 relative to one another, thus increasing or decreasing the length of the lasing chamber. Thermal expansion/contraction of the laser wall 12 provides a wide range of frequency change. However, response of the laser body to a change in the signal applied to the heating element 36 is slow due to a long time for thermal response of the heating element and time required for tranfer of heat to the laser body. The heating element 36 thus provides a slow reacting, widerange adjustment for beat signal frequency.

The described means for frequency control is driven by a closed loop elctronic servo control, schematically depicted in FIG. 3. The secondary laser beam 22 pasing through the window of reflector 20 is directed through a polarizing element (polarizer) 60. The polarizer 60 reduces the intensity of each of the circularly polarized component frequency modes and linearly polarizes a portion of each component mode in a unidirectional plane. The unidirectional components combine, or interfere, to produce a heterodyned light wave 61 displaying the cyclic beat signal as is known through the laws of physics to be generated when mixing differing frequency signals. See *Physics,* by Resnick and Halliday, Vol. 1, page 510. Descriptively, the amplitude of the heterodyned wave 61 varies periodically with time with the recurring maximum amplitude events displaying a characteristic beat. (The heterodyned wave has a frequency determinable as an average of the frequencies of the two component mode waves even though the amplitude continually varies.) The frequency of the periodic variation in amplitude, or beat, equals the difference in frequency of the individual component waves. Thus the beat signal frequency is a clear indicator of the frequency difference found between the component waves and can be used to determine the frequency difference between the Zeeman split component frequency modes of the laser beam. This phenomenon is described in the following articles: Interferometric Measurement of Length and Distance, by W. R. C. Rawley (1972 Alta Frequenta v. 41); Zeeman Effects in an He-Ne Laser, by P. T. Baldwijn (Physics and Quantum Electronics, p. 620, McGraw-Hill Book Co.), Derivation of Frequency-Sensitive Signal from a Gas Laser in an Axial Magnetic Field, by Irwin Tobias (Applied Physics Letters, Vol. 6, p. 10) and Physics Treatise by Resnick and Halliday (Wiley Publishing Co.).

The heterodyned light wave 61 is applied to a photodetector-amplifier 62 which generates an electrical signal 64 having the characteristic beat signal frequency found in the heterodyned wave 61. The signal 64 thus corresponds in frequency to the beat displayed by the interfering component frequency modes in lash beam 61 and equals the difference in frequency of the component frequency modes. This signal will be referred to herein as the beat signal 64.

The photodetector and amplifier 62 are commonly known and used elements, available from many manufacturers. For instance, these elements may be purchased from Motorola Inc. under PLN MRD 510 and National Semiconductor Inc. under Pln LM 318 respectively.

A reference signal source 66 supplies a pulsed reference signal 68 having a selected frequency of 250 ; KHz. The clock 66 may comprise a crystal oscillator for producing a pulse signal and a frequency divider (i.e., a divide by N type counter) to step down the crystal signal frequency to the desired reference frequency of 250 KHz. These elements are also commonly known and used electronic elements, available from many manufacturers. For instance, these elements may be purchased from Monitor Co. under P/n MM18N-4.0 Mhz and National Semiconductor Inc. under P/n MM 74HC-393, respectively.

The reference signal 68 exhibits the selected frequency of 250 KHz as determined by extensive research performed by Applicant on numerous commercially available lasers. The results of this research have indicated that a 250 KHz signal possesses a desirable frequency which is easily obtainable from available signal oscillators and which is a select median of the characteristic frequency range of the difference in frequency of component modes generated by the lasers tested under influence of an axial magnetic field.

The reference signal 68 and the beat signal 64 are simultaneously applied to a phase detector 70. The phase detector 70 generates an output signal 74 having a voltage level porportional to the difference in phase between the beat signal 64 and the reference signal 68. The phase detector 70 is a commercially available electronic component manufactured by the Motorola Corporation under Part No. 14046B. More information is available regarding phase detector 70 and its output signal in the CMOS Data Book by Motorola on p. 7-124.

The output signal of the phase detector 70 is a voltage signal which varies in time. The voltage level of the output signal 74 varies in proportion to the phase difference between the applied input signals 64 and 68. The output signal 74 of phase detector 70 indicates an instantaneous phase correction required to bring applied signals 64 and 68 into identical phasing. Since this can be accomplished by adjusting the frequency of one or the other, for instance beat signal 64 through tuning the frequency differential between component frequency modes of the laser beam, the output signal 74 of phase detector 70 is directly related to a change required in the frequency difference of the component modes. It is thus an instantaneous correction signal which can be applied over time to the adjustment elements 36 and 40 to vary the frequency difference between the laser beam components and bring the signals 64 and 68 into phase, stabilizing the beat signal 64 at a constant frequency equal to signal 68. This accomplishes direct control and stabilization of the heterodyned laser beam beat signal frequency at the identical reference signal frequency of 250 KHz. It assures the beat signal is maintained at a constant known frequency, and an electrical signal synchronized with the laser beam beat is available for reference with data processing systems.

The output signal 74 of the phase detector 70 is integrated with respect to time by an integrator 72 which effectively sums signal changes or correction signal provided by the phase detector 70 over time. The integrator 72 produces an error signal 64 having a voltage which represents the change in frequency difference that is required beteen the component frequency modes to bring the beat signal 64 and the reference signal 68 into phase. Integrator circuits applicable to this invention are also discused in the referenced Motorola CMOS Data Book.

The error signal 64 is amplified by an amplifier 76. The amplified error signal 78 is applied directly to the electromagnetic coil 40 to obtain immediate correction within the frequency adjustment of frequency difference Δf within the frequency adjustment range of the magnetic field upon the component frequency modes. The instantaneous adjustability of the magnetic field effect provides fine tuning control which allows the electronic servo to lock the beat signal 64 and the reference signal 68 in phase and provide direct control of the difference in frequency of component frequency modes, and thus the beat signal frequency found in the laser beam.

The amplified error signal 78 is also applied to an operational amplifier 80. The operational amplifier 80 acts as a differential amplifier comparing the amplified error signal 78 with a reference voltage signal 82 which is generated by a reference voltage source 84. The reference voltage signal 82 is selected at a voltage which has been experimentally determined as a median voltage which should be applied to the electromagnetic coil 40 to adequately provide instantaneous bidirectional adjustment of the difference in frequency between the component frequency modes of the laser beam.

If the operational amplifier 80 receives an error signal 78 which has a lower voltage than the reference voltage 82 (decreasing the magnetic field generated by electromagnetic coil), the amplifier 80 will decrease voltage and thus current flow of signal 86 to the heating element 36 which decreases heat applied to th laser body 16 to contrast the laser body shortening the distance between reflectors 18 and 20. If the operational amplifier receives an error signal 78 having a voltage greater than the reference voltage 82 (increasing the magnetic field generated by electromagnetic coil 4), the amplifier 80 will increase the voltage and thus flow of signal current 86 to heating element 36 to increase heat applied, expanding the laser body 16 increasing the distance between reflectors 18 and 20. Thus, with a reference voltage 82 selected to generate a magnetic field determined experimentally to be a median point signal, the laser length will be driven by thermal energy to perform macro adjustments to the lasing chamber length to control frequency difference between component modes, while the magnetic field generated by the electromagnetic coil provides micro-adjustment to frequency difference within its limited range of control.

The operational amplifier circuit and its operation is described in many reference materials, for example, Analog and Digital Electronics by Vassos and Ewing (John Wiley & Sons, N.Y., N.Y.) and Analysis and Design of Digital Circuits by Chirlian (Matrix Publishers, Champaign, Ill.)

Once the servo control system obtains stability of the frequency difference and the error signal 74 remains relatively unchanged because the phase of signal 64 has been tuned to the phase of signal 68, the phase detector 70 will phase lock the beat signal 64 with the clock reference signal 68. Thereafter any infinitely small variation in phase will trigger the phase detector 70 to generate an immediate error signal 74, causing the electromagnetic coil 40 to immediately react correctively with a change in the generated magnetic field. The beat signal 64 thus stabilized assures that the difference in frequency of the combined component frequency modes of the laser beam, is also stabilized, at a fixed value of 250 KHz (or a simple multiple of the 250 KHz reference signal), which results in a stable and constant beat signal frequency in the laser beam which can be used as a scale of measurement.

What is claimed is:

1. In a closed loop feedback control for frequency stabilization of a laser containing an excited lasing material within a lasing chamber influenced by a first magnetic field to generate a laser beam having two component frequency modes of differing frequency in said laser beam, a thermal control means for applying thermal energy to said lasing chamber for adjusting lasing chamber length to control frequency difference of component frequency modes of the laser beam over a wide range, said feedback control having a polarizer for receiving said laser beam and interfering common linearly polarized components of said component frequency modes, to produce a heterodyned light beam with an intensity modulation having a beat frequency representing the difference in frequency between said component frequency modes:

a photodectector for receiving said heterodyned light beam to generate a beat signal representing the intensity modulation of said heterodyned light beam, said beat signal representing the difference in frequency between the component frequency modes;

a reference signal generator for producing a reference signal having a frequency characteristic of a desired beat signal frequency; and a phase detector and an integrator for comparing the phase of said beat signal and said reference signal, and producing an error signal responsive to the difference in phase between said signals with respect to time;

an improvment comprising:

a magnetic control means for applying a second varying magnetic field to said lasing chamber during influence by said first magnetic field to control frequency difference of component frequency modes of the laser beam over a limited range; and said thermal and said magnetic control means thermally changing the length of said lasing chamber and electromagnetically varying the magnetic field influencing the lasing material respectively to obtain a controlled frequency difference between component frequency modes of said laser beam, which component frequency modes produce, when herteodyned an intensity modulation beat signal having a phase which is locked with the phase of said reference signal to determine said frequency difference between component modes.

2. The feedback control of claim 1 wherein said magnetic control means responsive to said error signal comprises an electromagnetic coil surrounding a portion of said lasing chamber responsive to said error signal, and said second thermal control means comprises an operational amplifier responsive to said error signal for producing a power output and a thermal element normally connected with said laser body and responsive to said power output, which operate to vary the frequency difference between component frequency modes in the laser beam in response to changes in said error signal.

* * * * *